United States Patent
Nishizaki et al.

(10) Patent No.: US 11,191,112 B2
(45) Date of Patent: Nov. 30, 2021

(54) VEHICLE COMMUNICATION SYSTEM

(71) Applicant: Yazaki Corporation, Tokyo (JP)

(72) Inventors: Ryohei Nishizaki, Shizuoka (JP); Shingo Suzuki, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/075,661

(22) Filed: Oct. 20, 2020

(65) Prior Publication Data
US 2021/0127432 A1    Apr. 29, 2021

(30) Foreign Application Priority Data
Oct. 25, 2019 (JP) .............................. JP2019-193941

(51) Int. Cl.
| | |
|---|---|
| *H04W 4/00* | (2018.01) |
| *H04W 76/10* | (2018.01) |
| *H04W 4/40* | (2018.01) |
| *G08G 1/01* | (2006.01) |
| *H04W 28/02* | (2009.01) |
| *H04W 88/04* | (2009.01) |

(52) U.S. Cl.
CPC .......... *H04W 76/10* (2018.02); *G08G 1/0125* (2013.01); *H04W 4/40* (2018.02); *H04W 28/0289* (2013.01); *H04W 88/04* (2013.01)

(58) Field of Classification Search
CPC ... H04W 76/10; H04W 4/40; H04W 28/0289; H04W 88/04; H04W 36/36; H04W 36/32; H04W 36/22; H04W 84/12; H04W 48/16; H04W 4/029; H04W 48/20; H04W 4/44; H04W 36/08; H04W 48/04; H04W 48/06; G08G 1/0125

USPC ........................................................ 370/329
See application file for complete search history.

(56) References Cited

U.S. PATENT DOCUMENTS

| | | | | |
|---|---|---|---|---|
| 8,634,822 | B2* | 1/2014 | Silver | H04M 1/72463 455/420 |
| 10,320,923 | B2* | 6/2019 | Moghe | H04W 36/00835 |
| 10,602,312 | B2* | 3/2020 | Tsuchida | H04W 4/025 |
| 10,906,539 | B2* | 2/2021 | Yang | G01S 19/43 |
| 11,076,320 | B2* | 7/2021 | Nakata | H04W 64/006 |
| 2015/0009822 | A1 | 1/2015 | Du et al. | |

(Continued)

FOREIGN PATENT DOCUMENTS

JP        2017-85226 A    5/2017

*Primary Examiner* — Amancio Gonzalez
(74) *Attorney, Agent, or Firm* — Kenealy Vaidya LLP

(57) ABSTRACT

The vehicle communication system includes a management server and an in-vehicle communication device. The management server manages a plurality of access points for communication relay. The in-vehicle communication device is mounted on a vehicle and is capable of wirelessly communicating with the access points. The in-vehicle communication device transmits, for example, travel route information indicating a travel route to a destination of the vehicle to the management server. The management server transmits access point information indicating the access points connectable, to the in-vehicle communication device using the travel route information transmitted from the in-vehicle communication device and a congestion level of the access point. The in-vehicle communication device connects to the access point using the access point information transmitted from the management server.

4 Claims, 3 Drawing Sheets

(56) References Cited

U.S. PATENT DOCUMENTS

| | | |
|---|---|---|
| 2016/0057691 A1 | 2/2016 | Burton et al. |
| 2016/0366069 A1* | 12/2016 | Ishihara .................. H04L 67/32 |
| 2019/0138008 A1* | 5/2019 | Ross .................... H04B 17/318 |
| 2019/0297526 A1* | 9/2019 | Das ........................ H04W 4/06 |
| 2020/0120458 A1* | 4/2020 | Aldana ............... H04W 72/048 |

* cited by examiner

FIG.3

| CONNECTION INFORMATION | ACCESS POINT | COMMUNICATION AREA POSITION |
|---|---|---|
| 1 | ACCESS POINT 10C | xxxx.xxxx |
| 2 | ACCESS POINT 10D | yyyy.yyyy |

FIG.4

START

S1: MANAGEMENT SERVER OBTAINS CONGESTION LEVEL FROM ACCESS POINTS

S2: MANAGEMENT SERVER OBTAINS TRAVEL ROUTE INFORMATION OF VEHICLE FROM IN-VEHICLE COMMUNICATION DEVICE

S3: MANAGEMENT SERVER SELECTS CONNECTION ACCESS POINTS BASED ON TRAVEL ROUTE INFORMATION OF VEHICLE (ACCESS POINT INFORMATION)

S4: MANAGEMENT SERVER TRANSMITS ACCESS POINT INFORMATION TO IN-VEHICLE COMMUNICATION DEVICE

S5: IN-VEHICLE COMMUNICATION DEVICE CONNECTS TO ACCESS POINT BASED ON ACCESS POINT INFORMATION

END

VEHICLE COMMUNICATION SYSTEM

CROSS-REFERENCE TO RELATED APPLICATION(S)

The present application claims priority to and incorporates by reference the entire contents of Japanese Patent Application No. 2019-193941 filed in Japan on Oct. 25, 2019.

BACKGROUND OF THE INVENTION

1. Field of the Invention

The present invention relates to a vehicle communication system.

2. Description of the Related Art

Conventionally, as the vehicle communication system, for example, Japanese Patent Application Laid-open No. 2017-085226 describes a communication system is which a communication terminal performs wireless communication via an access point. This communication system improves convenience while maintaining security by automatically permitting connection to the access point when a MAC address of the communication terminal is already registered in an information table.

In the communication system described in Japanese Patent Application Laid-open No. 2017-085226 described above, for example, when the communication terminal connects to the access point having a high congestion level, communication may be delayed.

SUMMARY OF THE INVENTION

The present invention has been made in view of the foregoing, and an object of the present invention is to provide a vehicle communication system capable of suppressing deterioration of communication quality.

In order to solve the above mentioned problem and achieve the object, a vehicle communication system according to one aspect of the present invention includes a management server that manages a plurality of access points for communication relay; and an in-vehicle communication device that is mounted on a vehicle and is capable of wirelessly communicating with the access points, wherein the in-vehicle communication device transmits travel route information indicating a travel route to a destination of the vehicle to the management server, the management server transmits access point information indicating the access points connectable, to the in-vehicle communication device, using the travel route information transmitted from the in-vehicle communication device and a congestion level of the access points, and the in-vehicle communication device connects to the access point using the access point information transmitted from the management server.

According to another aspect of the present invention, in the vehicle communication system, it is preferable that the management server makes the access points having a congestion level lower than a predetermined reference value connectable, out of the access points located in a range in which the in-vehicle communication device enables communication from the travel route, and makes the access points having a congestion level not lower than the reference value unconnectable.

According to still another aspect of the present invention, in the vehicle communication system, it is preferable that the in-vehicle communication device requests the management server for the access point information at a predetermined cycle based on a travel distance or a travel time.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating access point information according to the embodiment; and FIG. 4 is a flowchart illustrating an operation example of the vehicle communication system according to the embodiment.

DETAILED DESCRIPTION OF THE PREFERRED EMBODIMENTS

Modes (embodiments) for carrying out the present invention will be described in detail with reference to the drawings. The present invention is not limited by the contents described in the embodiments below. Furthermore, components described below include those that can be easily conceived by those skilled in the art and those that are substantially the same. Furthermore, configurations described below can be appropriately combined. Furthermore, various omissions, substitutions, or changes in the configuration can be made without departing from the scope of the present invention.

Embodiment

Figure 1:
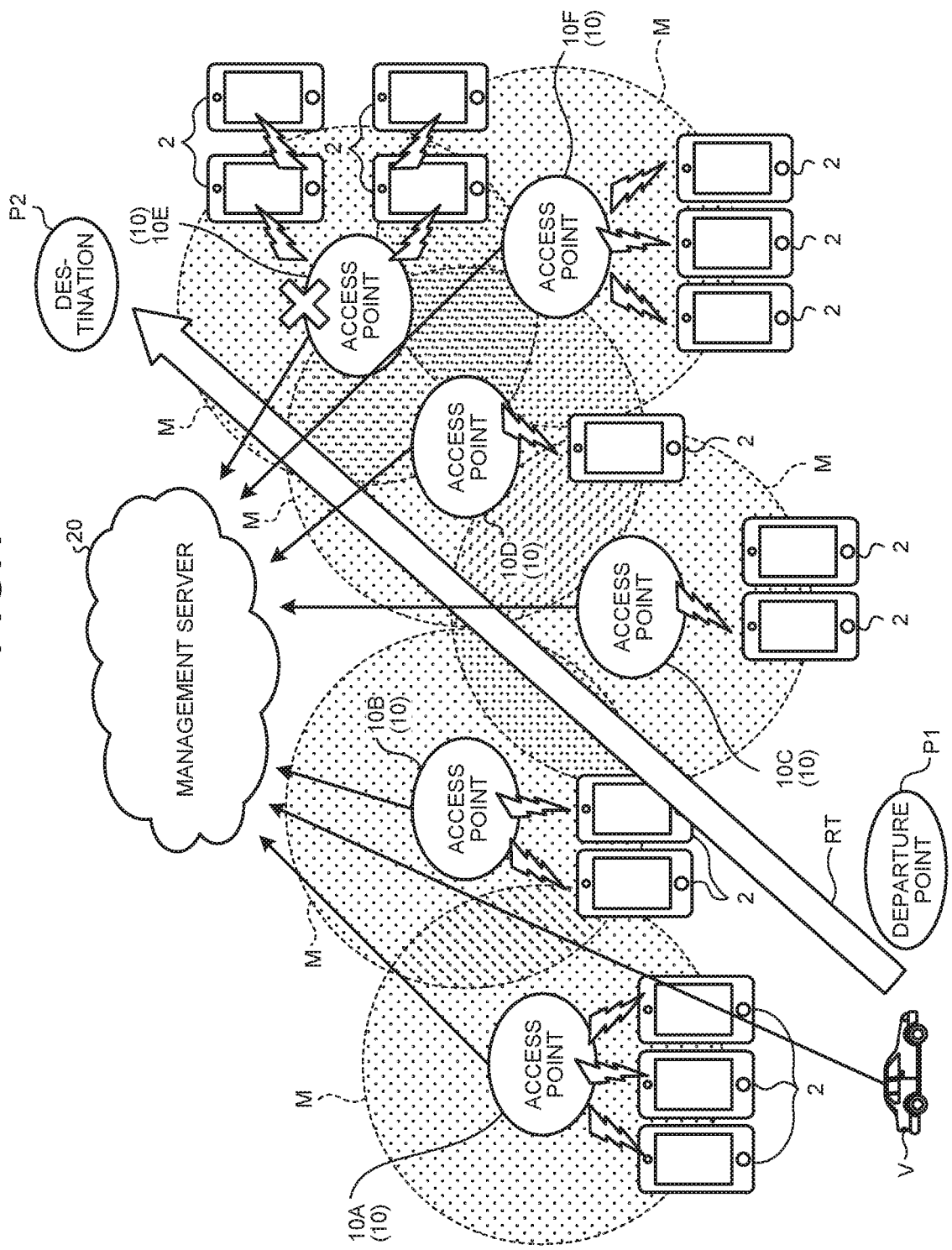
FIG. 1 is a schematic diagram illustrating a configuration example of a vehicle communication system according to an embodiment.
Figure 2:
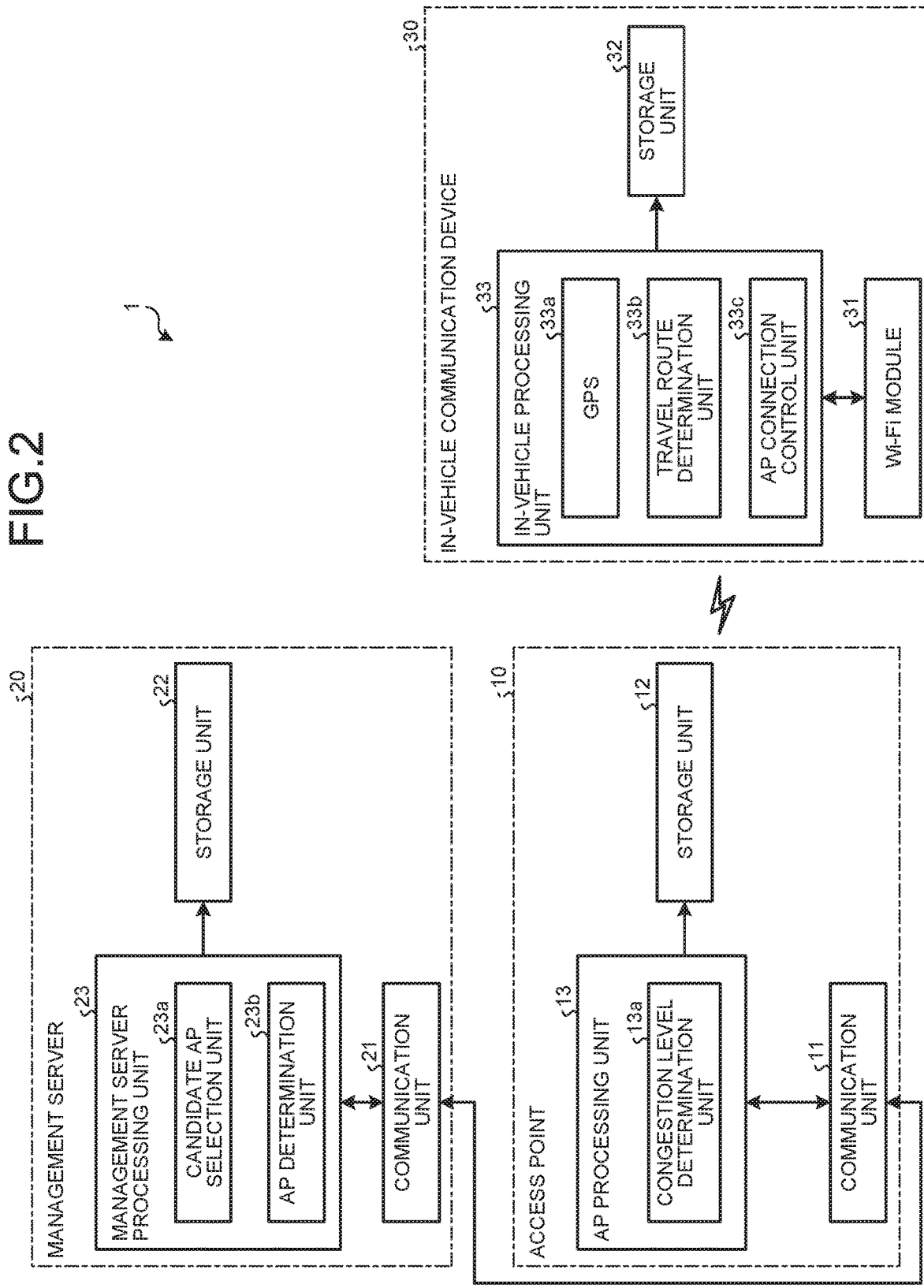
FIG. 2 is a block diagram illustrating the configuration example of the vehicle communication system according to the embodiment.

A vehicle communication system 1 according to the embodiment will be described with reference to the drawings. FIG. 1 is a schematic diagram illustrating a configuration example of a vehicle communication system 1 according to the embodiment. FIG. 2 is a block diagram illustrating the configuration example of the vehicle communication system 1 according to the embodiment. FIG. 3 is a diagram illustrating access point information according to the embodiment. The vehicle communication system 1 is a system in which an in-vehicle communication device 30 mounted on a vehicle V performs wireless communication using the access point information. The vehicle communication system 1 includes, for example, as illustrated in FIG. 1, a plurality of access points 10 (10A to 10F), a management server 20, and the in-vehicle communication device 30.

The access points 10 are communication devices for communication relay, that constitute a wireless LAN (Local Area Network). The access points 10 function as relay points for connecting the in-vehicle communication device 30 to an external communication network (not shown) via the wireless LAN. The access points 10 constituting the wireless LAN is capable of communicating with the in-vehicle communication device 30 within a communication area M, in which the access point 10 enables communication. As illustrated in FIG. 2, the access point 10 includes a communication unit 11, a storage unit 12, and an AP processing unit 13. The communication unit 11 communicates with the management server 20 and the in-vehicle communication device 30. The communication unit 11 is, for example, wire-connected to a communication unit 21 of the management server 20, and performs wired communication with the communication unit 21 of the management server 20. The communication unit 11 is wirelessly connected to a Wi-Fi module 31 of the in-vehicle communication device 30 and wirelessly communicates with the Wo-Fi module 31. The communication unit 11 is connected to the AP processing unit 13 and transmits transmission data output from the AP processing unit 13 to the management server 20 and the in-vehicle communication device 30. The communication unit 11 outputs received data received from the management server 20 and the in-vehicle communication device 30 to the AP processing unit 13.

The storage unit 12 is a storage device including a semiconductor memory and the like. The storage unit 12 stores therein conditions and information necessary for various processes in the AP processing unit 13, various computer programs and applications executed by the AP processing unit 13, control data, and the like. The storage unit 12 can also temporarily store therein various types of information processed by the AP processing unit 13. The AP processing unit 13 reads out these pieces of information from the storage unit 12 as needed.

The AP processing unit 13 connects the in-vehicle communication device 30 and the external communication network in response to a connection request from the in-vehicle communication device 30. The AP processing unit 13 includes an electronic circuit mainly including a well-known microcomputer including a CPU and an interface. When the AP processing unit 13 receives the connection request from the in-vehicle communication device 30 via the communication unit 11, the AP processing unit 13 performs a connection process with the in-vehicle communication device 30. The AP processing unit 13 performs authentication, for example, using an SSID or password transmitted from the in-vehicle communication device 30, and establishes a connection with the in-vehicle communication device 30 after obtaining verification of the authentication.

The AP processing unit 13 is connected by a plurality of communication terminals 2 including the in-vehicle communication device 30 and other communication devices. When data communication is performed by the connected communication terminals 2, a usage rate of the AP processing unit 13 increases. Here, the usage rate of the AP processing unit 13 is a rate at which the AP processing unit 13 is actually processing data with respect to the maximum processing capacity capable of processing the data. The usage rate of the AP processing unit 13 indicates congestion level of the access point 10, and indicates that the congestion level is high when the usage rate is relatively high, and the congestion level is low when the usage rate is relatively low.

The AP processing unit 13 has a congestion level determination unit 13a. The congestion level determination unit 13a determines the congestion level of the access point 10 according to the usage rate of the AP processing unit 13. The congestion level determination unit 13a transmits the determined congestion level to the management server 20 via the communication unit 11. The congestion level determination unit 13a transmits the congestion level to the management server 20, for example, periodically or in response to a request from the management server 20.

The management server 20 is a cloud server that manages the access points 10. The management server 20 includes the communication unit 21, a storage unit 22, and a management server processing unit 23. The communication unit 21 communicates with the access point 10. The communication unit 21 is, for example, wire-connected to the communication unit 11 of the access point 10 and performs wired communication with the communication unit 11 of the access point 10. The communication unit 21 is connected to the management server processing unit 23 and transmits the transmission data output from the management server processing unit 23 to the access point 10. The communication unit 21 outputs the received data received from the access point 10 to the management server processing unit 23.

The storage unit 22 is a storage device including a semiconductor memory and the like. The storage unit 22 stores therein conditions and information necessary for various processes in the management, server processing unit 23, various computer programs and applications executed by the management server processing unit 23, control data, and the like. The storage unit 22 stores therein, for example, map data. The storage unit 22 can also temporarily store therein various types of information processed by the management server processing unit 23. The management server processing unit 23 reads out these pieces of information from the storage unit 22 as needed.

The management server processing unit 23 determines the access points 10 connectable on a travel route RT. The management server processing unit 23 includes the electronic circuit mainly including a well-known microcomputer including the CPU and the interface. The management server processing unit 23 includes a candidate AP selection unit 23a and an AP determination unit 23b. The candidate AP selection unit 23a selects the access point 10 that is a candidate for a connection destination from all the access points 10 managed by the management server 20.

The candidate AP selection unit 23a selects candidate access points from the access points 10, for example, using travel route information transmitted from the in-vehicle communication device 30. Here, the travel route information is information indicating a route when the vehicle V travels from a departure point P1 to a destination P2 on the map data. The candidate AP selection unit 23a selects the access point 10 located in a range, in which the in-vehicle communication device 30 enables communication from the travel route RT, as the candidate access points, using the travel route RT indicated by the travel route information transmitted from the in-vehicle communication device 30. That is, the candidate AP selection unit 23a selects the access point 10 including the travel route RT in the communication area M as the candidate access points.

For example, when the vehicle V travels on the travel route RT illustrated in FIG. 1, the candidate AP selection unit 23a selects the access points 10B, 10C, 10D, and 10E located in a communicable range of the in-vehicle communication device 30 as the candidate access points. Then, when the communication areas M of the candidate access points overlap each other, the candidate AP selection unit 23a selects an access point closer to the travel route RT as the candidate access point. For example, when the communication area M of the access point 10B and the communication area h of the access point 10C overlap each other, the candidate AP selection unit 23a selects the access point 10C closer to the travel route RT. The candidate AP selection unit 23a outputs the selected access points 10C, 10D, and 10E to the AP determination unit 23b.

The AP determination unit 23b determines a connection access point, which is the access point 10 to be finally connected from the candidate access points selected by the candidate AP selection unit 23a. The AP determination unit 23b determines the connection access point, for example, using the congestion levels transmitted from the candidate access points 10C, 10D, and 10E. The AP determination unit 23b determines, for example, the access point 10 having a congestion level lower than a predetermined reference value as the connection access point, while not determining the access point 10 having a congestion level not lower than the reference value as the connection access point.

In the example illustrated in FIG. 1, the candidate access point 10C is connected to two communication terminals 2, the candidate access point 10D is connected to one communication terminal 2, and the candidate access point 10E is connected to four communication terminals 2. The AP determination unit 23b determines, for example, that the candidate access points 10C and 10D to which two or less (less than the reference value) communication terminals 2 are connected have a low congestion level, and the candidate access point 10E to which four (more than the reference value) communication terminals 2 are connected have a high congestion level. Then, the AP determination unit 23b determines the access points 10C and 10D having a low congestion level as the connection access points, while making the access point 10E having a high congestion level unconnectable. The AP determination unit 23b transmits the access point information (see FIG. 3), that indicates the determined connection access point and a position of the communication area M of the connection access point, to the in-vehicle communication device 30 via the communication unit 21 and the like. When the access point 10E having a high congestion level is made unconnectable as described above, the in-vehicle communication device 30 has a section incommunicable via the Wi-Fi module 31 on the travel route RT. However, in this case, it is preferable to communicate with the external communication network via a wide area communication de vice compatible with, for example, LIE (Long Term Evolution) or the like.

The in-vehicle communication device 30 connects to the external communication network via the access point 10 and the like. The in-vehicle communication device 30 is a device mounted on the vehicle V and capable of wirelessly communicating with the access point 10. The in-vehicle communication device 30 includes the Wi-Fi (Wireless Fidelity) module 31, a storage unit 32, and an in-vehicle processing unit 33. The Wi-Fi module 31 wirelessly communicates with the access point 10. The Wi-Fi module 31 is connected to the in-vehicle processing unit 33 and transmits the transmission data output from the in-vehicle processing unit 33 to the access point 10. The Wi-Fi module 31 outputs the received data received from the access point 10 to the in-vehicle processing unit 33.

The storage unit 32 is a storage device including a semiconductor memory and the like. The storage unit 32 stores therein conditions and information necessary for various processes in the in-vehicle processing unit 33, various computer programs and applications executed by the in-vehicle processing unit 33, control data, and the like. The storage unit 32 stores therein, for example, the map data. The storage unit 32 can also temporarily store therein various types of information processed by the in-vehicle processing unit 33. The in-vehicle processing unit 33 reads out these pieces of information from the storage unit 32 as needed.

The in-vehicle processing unit 33 controls the connection with the access point 10. The in-vehicle processing unit 33 includes the electronic circuit mainly including a well-known microcomputer including the CPU and the interface. The in-vehicle processing unit 33 includes a GPS (Global Positioning System) 33a, a travel route determination unit 33b, and an AP connection control unit 33c. The UPS 33a is a receiver that receives UPS information (latitude/longitude coordinates) of the vehicle V distributed by UPS satellites as position information of the vehicle V. The GPS 33a identifies a position of the vehicle V using the GPS information received from the UPS satellites.

The travel route determination unit 33b determines the travel route RT of the vehicle V. The travel route determination unit 33b determines as the travel route RT, for example, a route connecting the departure point P1, which is a current position of the vehicle V identified by the GPS 33a, and the destination P2 set on the basis of the map data stored in the storage unit 32. The travel route determination unit 33b transmits the travel route information indicating the determined travel route RT to the management server 20 via the Wi-Fi module 31 and the like.

The AP connection control unit 33c controls the connection with the access point 10. After the travel route determination unit 33h transmits the travel route information to the management server 20, the AP connection control unit 33c connects the in-vehicle communication device 30 to the access point 10 using the access point information transmitted from the management server 20. The AP connection control unit 33c connects the in-vehicle communication device 30 to the access point 10, for example, determined from the connection access points according to a travel position on the travel route RT. For example, when the travel position on the travel route RT is included in the communication area M of the access point 10C, the AP connection control unit 33c connects the in-vehicle communication device 30 to the access point 10C determined from the connection access points via the Wi-Fi module 31.

For example, the Wi-Fi module 31 confirms with the access point 10C whether the SSID is appropriate. After confirming the SSID, the Wi-Fi module 31 applies for authentication to the access point 10C for connecting to the access point 10C. The access point 10C authenticates the connection of the Wi-Fi module 31 by a predetermined authentication method. After confirming connection authentication to the access point 10C, the Wi-Fi module 31 makes a connection request (an association request) to the access point 10C. The Wi-Fi module 31 starts communication with the access point 10C when the association request is permitted by the access point 10C.

The AP connection control unit 33c requests the management server 20 for the access point information at a predetermined cycle. The cycle of requesting the access point information, that is, a timing of requesting the access point information is determined according to a travel distance or a travel time. The AP connection control unit 33c requests the management server 20 for the access point information, for example, when the travel distance reaches several tens of meters to several hundreds of meters. Furthermore, the AP connection control unit 33c may request the management server 20 for the access point information when the travel time elapses from several tens of seconds to several minutes. The travel distance and travel time when determining the cycle are appropriately set according to road conditions such as traffic congestion.

Then, an operation example of the vehicle communication system 1 will be described. FIG. 4 is a flowchart illustrating the operation example of the vehicle communication system 1 according to the embodiment. In the vehicle communication system 1, the management server 20 obtains the congestion level of the access point 10 from the access points 10 (Step S1). The congestion level of the access point 10 is indicated by, for example, the usage rate of the AP processing unit 13 of the access point 10, the congestion level is high if the usage rate of the AP processing unit 13 is relatively high, and the congestion level is low if the usage rate of the AP processing unit 13 is relatively low.

Subsequently, the management server 20 obtains the travel route information of the vehicle V from the in-vehicle communication device 30 (Step S2). The travel route information is information indicating a route when the vehicle V travels from the departure point P1 to the destination P2. The management server 20 selects the connection access points using the obtained travel route information of the vehicle V (Step S3). The management server 20 selects, for example, the access points 10 located in the range, in which the in-vehicle communication device 30 enables communication from the travel route RT, as the candidate access points, and determines the candidate access point having a low congestion level from the selected candidate access points as the connection access point.

Subsequently, the management server 20 transmits the access point information indicating the determined connection access point to the in-vehicle communication device 30 (Step S4). Subsequently, the in-vehicle communication device 30 connects to the connection access point using the access point information transmitted from the management server 20 (Step S5). The in-vehicle communication device 30 connects to, for example, the access point 10 determined from the connection access points according to the travel position on the travel route RT.

As described above, the vehicle communication system 1 according to the embodiment includes the management server 20 and the in-vehicle communication device 30. The management server 20 manages the access points 10 for communication relay. The in-vehicle communication device 30 is mounted on the vehicle V and is capable of wirelessly communicating with the access point 10. The in-vehicle communication device 30 transmits, for example, the travel route information indicating the travel route RT to the destination P2 of the vehicle V to the management server 20. The management server 20 transmits the access point information indicating the connectable access points 10 to the in-vehicle communication device 30 using the travel route information transmitted from the in-vehicle communication device 30 and the congestion level of the access point 10. The in-vehicle communication device 30 connects to the access point 10 using, the access point information transmitted from the management server 20.

With this configuration, the vehicle communication system 1 is capable of suppressing the in-vehicle communication device 30 from connecting to the access point 10 having a high congestion level on the travel route RT, and is capable of suppressing connection failure, communication interruption, communication delay, and the like. As a result, the vehicle communication system 1 is capable of suppressing deterioration of communication quality. Since the vehicle communication system 1 connects the in-vehicle communication device 30 to the access point 10 using the access point information, it is possible to suppress a time for searching for the access point 10. Furthermore, since the vehicle communication system 1 can grasp the access point 10, which is planned to be used by the in-vehicle communication device 30 of another vehicle different from the in-vehicle communication device 30 of an own vehicle, it is possible to predict the congestion level of the access point 10, and to provide the access point information on the basis of this prediction.

In the vehicle communication system 1, the management server 20 makes the access point 10 having a congestion level lower than the predetermined reference value connectable, out of the access points 10 located in the range in which the in-vehicle communication device 30 enables communication from the travel route RT, and makes the access point 10 having a congestion level not lower than the reference value unconnectable. With this configuration, since the vehicle communication system 1 does not connect the in-vehicle communication device 30 to the access point 10 having a high congestion level from the beginning, it is possible to suppress process of repeatedly trying to connect to the access point 10 having a high congestion level, and as a result, it is possible to suppress the deterioration of the communication quality.

In the vehicle communication system 1, the in-vehicle communication device 30 requests the management server 20 for the access point information at the predetermined cycle based on the travel distance or the travel time. With this configuration, the vehicle communication system 1 is capable of connecting the in-vehicle communication device 30 to the access point 10 using the access point information that is appropriately updated before reaching the destination P2. For example, when the vehicle communication system 1 requests the management server 20 for the access point information at the predetermined cycle based on the travel time, even if it takes longer than usual to reach the destination P2 due to the traffic congestion, the vehicle communication system 1 is capable of connecting the in-vehicle communication device 30 to the access point 10 using the access point information appropriately updated according to the time.

Modification

Then, a modification of the embodiment will be described. While an example has been described in which the candidate AP selection unit 23a selects the access point closer to the travel route RT as the candidate access points when there are the access points 10 having the communication areas M overlapping each other as candidates, the present invention is not limited to this. For example, when there are the access points 10 having the communication areas M overlapping each other as the candidates, the candidate AP selection unit 23a may select ail of the access points 10 as the candidates. In this case, the AP determination unit 23b determines a priority order of connection of the in-vehicle communication device 30 using the congestion levels at the candidate access points. For example, the AP determination unit 23b increases a priority of connection of the in-vehicle communication device 30 in the order of low congestion level at the access points 10 having the communication areas M overlapping each other. The in-vehicle communication device 30 tries to connect to the access points 10 in the order of high priority, that is, in the order of low congestion level, at the access points 10 having the communication areas h overlapping each other. For example, when the in-vehicle communication device 30 succeeds in connecting to the access point 10 having the highest priority, it does not connect to the access point 10 having the second highest priority. On the other hand, when the in-vehicle communication device 30 fails to connect to the access point 10 having the highest priority, it connects to the access point 10 having the second highest priority.

While an example has been described in which the in-vehicle communication device 30 requests the management server 20 for the access point information at the predetermined cycle based on the travel distance or the travel time, the present invention is not limited to this. For example, the in-vehicle communication device 30 requests the management server 20 for the access point information at the departure point P1 of the travel route RT, and need not request the management server 20 for the access point information until it reaches the destination P2.

The vehicle communication system 1 may be able to reserve the connection access point determined by the AP determination unit 23b. For example, when the vehicle communication system 1 determines the access points 100 and 10D having a low congestion level as the connection access points as described above, it may be able to reserve connections to the access points 10C and 10D.

While an example has been described in which the congestion level of the access point 10 is indicated by the usage rate of the AP processing unit 13 of the access point 10, the present invention is not limited to this, but the congestion level of the access point 10 may be indicated using other indexes.

While example has been described in which the travel route determination unit 33b transmits the travel route information to the management server 20 via the Wi-Fi module 31, the present invention is not limited to this. The travel route determination unit 33b may transmit the travel route information to the management server 20 via another communication network including a mobile (LTE) module or the like that performs wide area communication more widely than the Wi-Fi module 31 does.

While an example has been described in which the communication unit 11 of the access point 10 is wire-connected to the communication unit 21 of the management server 20 and performs wired communication with the communication unit 21 of the management server 20, the present invention is not limited to this. The communication unit 11 of the access point 10 may be, for example, wirelessly connected to the communication unit 21 of the management server 20, and wirelessly communicate with the communication unit 21 of the management server 20.

While an example has been described in which the communication unit 21 of the management server 20 is wire-connected to the communication unit 11 of the access point 10 and performs wired communication with the communication unit 11 of the access point 10, the present invention is not limited to this. The communication unit 21 of the management server 20 may be, for example, wirelessly connected to the communication unit 11 of the access point 10, and wirelessly communicate with the communication unit 11 of the access point 10.

Since the vehicle communication system according to the present embodiment connects the communication terminal to the access point using travel route information and congestion level of the access point, it is possible to suppress the communication terminal from connecting to the access point having a high congestion level, and as a result, it is possible to suppress the deterioration of the communication quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle communication system comprising:
   a management server that manages a plurality of access points for communication relay; and
   an in-vehicle communication device that is mounted on a vehicle and is capable of wirelessly communicating with the access points, wherein
   the in-vehicle communication device transmits travel route information indicating a travel route to a destination of the vehicle to the management server,
   the management server transmits access point information indicating the access points connectable, to the in-vehicle communication device, using the travel route information transmitted from the in-vehicle communication device and a congestion level of the access points, and
   the in-vehicle communication device connects to the access point using the access point information transmitted from the management server.

2. The vehicle communication system according to claim 1, wherein
   the management server makes the access points having a congestion level lower than a predetermined reference value connectable, out of the access points located in a range in which the in-vehicle communication device enables communication from the travel route, and makes the access points having a congestion level not lower than the reference value unconnectable.

3. The vehicle communication system according to claim 1, wherein
   the in-vehicle communication device requests the management server for the access point information at a predetermined cycle based on a travel distance or a travel time.

4. The vehicle communication system according to claim 2, wherein
   the in-vehicle communication device requests the management server for the access point information at a predetermined cycle based on a travel distance or a travel time.

* * * * *